(12) United States Patent
Yseboodt et al.

(10) Patent No.: US 10,855,479 B2
(45) Date of Patent: Dec. 1, 2020

(54) POWER PROVIDING SYSTEM

(71) Applicant: SIGNIFY HOLDING B.V., Eindhoven (NL)

(72) Inventors: Lennart Yseboodt, Retie (BE); Matthias Wendt, Würselen (DE)

(73) Assignee: SIGNIFY HOLDING B.V., Eindhoven (NL)

( * ) Notice: Subject to any disclaimer, the term of this patent is extended or adjusted under 35 U.S.C. 154(b) by 171 days.

(21) Appl. No.: 15/574,355

(22) PCT Filed: Apr. 29, 2016

(86) PCT No.: PCT/EP2016/059592
§ 371 (c)(1),
(2) Date: Nov. 15, 2017

(87) PCT Pub. No.: WO2016/184661
PCT Pub. Date: Nov. 24, 2016

(65) Prior Publication Data
US 2018/0139063 A1    May 17, 2018

(30) Foreign Application Priority Data

May 15, 2015  (EP) ..................... 15167792

(51) Int. Cl.
*H04L 12/10* (2006.01)
*G05B 19/042* (2006.01)

(52) U.S. Cl.
CPC ............ *H04L 12/10* (2013.01); *G05B 19/042* (2013.01)

(58) Field of Classification Search
CPC .............................. H04L 12/10; G05B 19/042
See application file for complete search history.

(56) References Cited

U.S. PATENT DOCUMENTS

| | | | |
|---|---|---|---|
| 8,782,442 B2 * | 7/2014 | Woo | G06F 1/266 324/522 |
| 2007/0103829 A1 | 5/2007 | Darshan et al. | |
| 2014/0108847 A1 | 4/2014 | Karam et al. | |
| 2014/0229747 A1 * | 8/2014 | Jain | H04L 12/413 713/300 |

FOREIGN PATENT DOCUMENTS

WO    2006099440 A1    9/2006

OTHER PUBLICATIONS

Abramson, David, "IEEE P802.3BT Mutual Identification," Interim Meeting, 2014 (17 Pages).
Patoka, Martin, POE Plus—IEEE 802.3AT, "Extended Classification Using Ping-Pong Scheme," Nov. 14, 2005 (9 Pages).

* cited by examiner

*Primary Examiner* — Bryan Bui
(74) *Attorney, Agent, or Firm* — Meenakshy Chakravorty

(57) ABSTRACT

The invention relates to a power providing system (1) comprising a power providing device (2) like a PSE and an electrical device (4) like a PD. In a classification mode in a first phase the power providing device provides one or several voltage pulses and the electrical device draws one or several classification current pulses for indicating the class of the electrical device, wherein in a second phase the power providing device provides one or several voltage pulses for indicating the class of the power providing device. Thus, the indication of the classes of the electrical device and of the power providing device is decoupled in two different phases, which can lead to an improved mutual classification procedure.

13 Claims, 7 Drawing Sheets

POWER PROVIDING SYSTEM

CROSS-REFERENCE TO PRIOR APPLICATIONS

This application is the U.S. National Phase application under 35 U.S.C. § 371 of International Application No. PCT/EP2016/059592, filed on Apr. 29, 2016, which claims the benefit of European Patent Application No. 15167792.9, filed on May 15, 2015. These applications are hereby incorporated by reference herein.

FIELD OF THE INVENTION

The invention relates to a power providing system comprising a power providing device and an electrical device. The invention further relates to a power providing device and an electrical device for being used in the power providing system and to a control method and computer program for controlling the power providing system.

BACKGROUND OF THE INVENTION

The Power over Ethernet (PoE) standard 802.3 at defines power source equipment (PSE) and a powered device (PD) which are connected via an Ethernet cable, wherein the PSE provides power to the PD via the Ethernet cable.

The document "Extended Classification Using Ping-Pong Scheme" by Martin Patoka, Nov. 14, 2005, XP002421779, URL: http://www.ieee802.org/3/at/public/nov05/patoka_1_1105.pdf discloses a classification procedure, wherein a PSE provides voltage pulses to a PD, the PD draws a sequence of classification current pulses indicating a class of the PD and the PSE determines the class of the PD based on the drawn sequence of classification current pulses.

The document "IEEE P802.3bt Mutual Identification" by David Abramson, IEEE802.3bt Interim Meeting, Sep. 19, 2014 XP055210753, URL: http://www.ieee802.org/3/bt/public/sep14/Abramson_01_0914.pdf, discloses a PoE standard 802.3bt defining that, when the PD is connected to the PSE, a classification procedure is performed, wherein the PSE produces certain voltage pulses for indicating the amount of power it has available to the PD and the PD draws a certain current, when the voltage pulses are produced, for indicating its class to the PSE.

SUMMARY OF THE INVENTION

Since the indication of the amount of power, which the PSE has available, is coupled with the indication of the class of the PD via the voltage pulses, which are used by a) the PSE for indicating the available amount of power and b) the PD for generating the current pulses for indicating its class, for certain combinations of PSEs and PDs a mutual indication of a) the available amount of power and b) the class of the PD may be difficult or not possible, for instance, if the PD needs a certain number of current pulses for indicating its class, whereas the PSE is only allowed to provide a lower number of voltage pulses for indicating the available amount of power.

It is an object of the present invention to provide a power providing system comprising a power providing device and an electrical device, which allows for an improved mutual indication of a) the amount of power providable by the power providing device and b) the class of the electrical device. It is a further object of the present invention to provide a power providing device and an electrical device for being used in the power providing system. Moreover, it is an object of the present invention to provide a control method and a computer program for controlling the power providing system.

In a first aspect of the present invention a power providing system comprising a power providing device and an electrical device is presented, wherein the power providing device and the electrical device are adapted to be operated in a classification mode, in which a class of the power providing device indicating the amount of power provided by the power providing device in an operational mode and a class of an electrical device indicating an amount of power at which the electrical device will be operated in an operational mode are determined, wherein the power providing device and the electrical device are adapted such that in the classification mode:

in a first phase, the power providing device provides one or several voltage pulses within a predefined voltage range to the electrical device and the electrical device draws one or several classification current pulses for indicating the class of the electrical device, wherein the power providing device measures the drawn one or several classification current pulses and determines the class of the electrical device based on the measured drawn current pulses, in a second phase, the power providing device provides one or several voltage pulses within the predefined voltage range for indicating the class of the power providing device to the electrical device, wherein the electrical device measures the one or several voltage pulses and determines the class of the power providing device depending on the measured voltage pulses.

Since in the first phase the power providing device determines the class of the electrical device based on the measured drawn current pulses, wherein in the separate second phase the electrical device determines the class of the power providing device based on the provided voltage pulses, the determination of the class of the electrical device and the determination of the class of the power providing device are decoupled. Thus, the determination of the class of the electrical device is not limited to the current pulses, which can be drawn by the electrical device, when the power providing device provides the voltage pulses for indicating the available amount of power. In the first phase the power providing device can provide as many voltage pulses as necessary for determining the class of the electrical device, even if the provided voltage pulses would indicate an amount of power which is not providable by the power providing device. This can lead to an improved mutual classification procedure.

The power providing system is preferentially a PoE power providing system, the power providing device is preferentially a PoE power providing device and the electrical device is preferentially a PoE electrical device. In accordance with the PoE standard, the PoE power providing device can also be named PSE and the PoE electrical device can be named PD. The predefined voltage range, which can also be regarded as being a classification voltage range, is, for instance, 15.5 V to 20.5 V.

In an embodiment the electrical device is adapted to, in the first phase, measure the voltage pulses provided by the power providing device and determine the class of the power providing device depending on the measured voltage pulses, wherein the power providing device is adapted to, after the first phase and before the second phase, provide no voltage being larger than a predefined threshold voltage at least for a predefined time, wherein the electrical device is adapted to reset the determination of the class of the power providing device, if the electrical device has not measured a voltage being larger than the predefined threshold voltage at least for the predefined time. Thus, in the first and second phases the electrical device can act in the same way, i.e. it is not necessary to configure the electrical device such that it behaves differently in the first and second phases. For resetting the determination of the class of the power providing device performed by the electrical device the power providing device may provide no voltage to the electrical device or a voltage being smaller than or equal to the predefined threshold voltage.

The power providing device and the electrical device can comprise electrical device classification rules defining a class of an electrical device based on classification current pulses, wherein the electrical device can be adapted to draw the classification current pulses in accordance with the electrical device classification rules for indicating the class of the electrical device, wherein the power providing device can be adapted to determine the class of the electrical device based on the electrical device classification rules and the measured classification current pulses. In particular, the power providing device can be adapted to, in the first phase, provide voltage pulses within the predefined voltage range, until classification current pulses have been measured being sufficient for classifying the electrical device in accordance with the electrical device classification rules.

Moreover, the power providing device and the electrical device can comprise power providing device classification rules defining a class of a power providing device based on measured voltage pulses, wherein the power providing device can be adapted to, in the second phase, provide voltage pulses within the predefined voltage range in accordance with the power providing device classification rules for indicating the class of the power providing device to the electrical device and wherein the electrical device can be adapted to determine the class of the power providing device based on the measured voltage pulses and the power providing device classification rules. In particular, the power providing device can be adapted to be able to, in the first phase, provide voltage pulses within the predefined voltage range in accordance with the power providing device classification rules which indicate a class which does not correspond to the power which the power providing device will provide in its operational mode.

The power providing device classification rules preferentially define the respective class, i.e. the respective amount of power which will be provided in the operational mode, depending on the number of voltage pulses provided by the power providing device. However, in the first phase the power providing device may provide as many voltage pulses within the predefined voltage range as required for determining the class of the electrical device, even if the number of voltage pulses indicates a wrong class of the power providing device. The correct class of the power providing device can then be determined in the second phase.

In an embodiment the power providing device is able to provide different amounts of power, in order to be operated in different classes, wherein the power providing device is adapted to, in the classification mode in the second phase, provide the one or several voltage pulses such that it indicates a class which corresponds to the class of the electrical device, which has been determined in the first phase. The power providing device can therefore adapt its class to the amount of power at which the electrical device will be operated in its operational mode. For instance, if the power providing device is able to provide 15 W, 30 W, 45 W, 60 W, 75 W or 90 W and if the class of the electrical device indicates that in its operational mode the electrical device will be operated at 45 W, in the second phase the power providing device will provide one or several voltage pulses indicating a class representing a provision of 45 W in the operational mode. The power providing device can therefore adapt its class to the amount of power at which the electrical device will be operated in its operational mode.

Moreover, in an embodiment the power providing device is able to provide different amounts of power, in order to be operated in different classes, wherein the power providing device is adapted to, in the classification mode in the second phase, provide the one or several voltage pulses such that it indicates a class which corresponds to the largest amount of power providable by the power providing device, if the class of the electrical device, which has been determined in the first phase, indicates an amount of power being larger than the amount of power maximally providable by the power providing device. The electrical device can be adapted to, if the determined class of the power providing device indicates an amount of power being smaller than the amount of power indicated by the class of the electrical device, be operated in its operational mode at the smaller amount of power provided by the power providing device. Thus, the power providing device may grant as much power as it is capable of allocating, even if that is less than what the electrical device requests. This may be called "power demotion". The alternative to this power demotion would be to not power the electrical device at all. However, with this scheme an electrical device can choose to operate at a lower power level, if it is capable of doing that.

The electrical device and the power providing device may be each assigned to a type of a group of possible types, wherein a type of a power providing device may indicate amounts of power providable by the power providing device in its operational mode and a type of an electrical device may indicate amounts of power at which the electrical device is operable in its operational mode, wherein the power providing device and the electrical device may be adapted such that in the classification mode:

in the first phase, the electrical device draws one or several classification current pulses for indicating the class and the type of the electrical device, wherein the power providing device determines the class and the type of the electrical device based on the measured drawn current pulses, and in the second phase, the power providing device provides one or several voltage pulses within the predefined voltage range for indicating the class and the type of the power providing device to the electrical device, wherein the electrical device determines the class and the type of the power providing device depending on the measured voltage pulses.

The type of a power providing device and the type of an electrical device may be regarded as being a container for certain capabilities and common specifications. The type of a power providing device may be indicated by the duration of the voltage pulses within the predefined voltage range and the class of a power providing device may be indicated by the number of voltage pulses within the predefined voltage range. The duration of the voltage pulses may not only depend on the type of the power providing device, but also on the whether the respective voltage pulse is the first, second or a subsequent voltage pulse. The electrical device can be adapted to indicate its type and class by drawing a certain sequence of classification current pulses. For instance, the electrical device can be adapted to draw five different amounts of classification current pulses numbered 0 through 4, wherein a sequence of these classification current pulses can indicate the respective type and class of the respective electrical device, i.e., for example, a first sequence 4,4,0,4 may indicate "type 3" with a class indicating that the electrical device will be operated at 30 W in its operational mode, and a second sequence 4,4,1,4 may indicate "type 3" with a class indicating that the electrical device will be operated at 45 W in its operational mode. Moreover, the power providing device may indicate its type based on the duration of the first voltage pulse. For instance, a "type 3" or a "type 4" power providing device may be indicated by a longer duration of the first voltage pulse, which might be within a range of 85 to 100 ms, and a "type 1" or a "type 2" power providing device may be indicated by a smaller duration of the first voltage pulse.

In an embodiment the electrical device is assigned to a type of a group of possible types, wherein a type of an electrical device indicates amounts of power at which the electrical device is operable in its operational mode, wherein the group of possible types of electrical devices includes a first type indicating one or several first amounts of power at which an electrical device is operable in its operational mode and a second type indicating one or several second amounts of power at which an electrical device is operable in its operational mode, wherein at least one of the one or several first amounts of power is equal to at least one of the one or several second amounts of power, wherein the power providing device and the electrical device are adapted such that in the classification mode, in the first phase, the electrical device draws one or several classification current pulses for indicating the class and the type of the electrical device and the power providing device determines the class and the type of the electrical device based on the measured drawn classification current pulses, even if the electrical device is of the first type or of the second type and will be operated at an amount of power in its operational mode, at which an electrical device of the first type is operable in its operational mode and an electrical device of the second type is operable in its operational mode. For instance, the first type of electrical devices may be named "type 2" and the second type of electrical devices may be named "type 3", wherein type 2 electrical devices and type 3 electrical devices may both be operable at 30 W in their respective operational modes and wherein in the classification mode in the first phase a type 2 electrical device, which will be operated at 30 W, may draw a first unique sequence of classification current pulses for indicating that it is a type 2 electrical device requesting 30 W and a type 3 electrical device, which will be operated at 30 W, may draw a second unique sequence of classification current pulses for indicating that it is a type 3 electrical device requesting 30 W. Thus, by using these unique sequences of classification current pulses a type 2 electrical device can be distinguished from a type 3 electrical device, even if they request the same amount of power, wherein, as already mentioned above, a type of an electrical device may not only indicate one or several amounts of power, at which the electrical device is operable in its operational mode, but also further capabilities, specifications, et cetera of the electrical device.

In an embodiment the electrical device is adapted to, in the first phase, measure the voltage pulses provided by the power providing device and determine the class and the type of the power providing device depending on the measured voltage pulses, wherein the power providing device is adapted to, after the first phase and before the second phase, provide no voltage being larger than a predefined threshold voltage at least for a predefined time, wherein the electrical device is adapted to reset the determination of the class and the type of the power providing device, if the electrical device has not measured a voltage being larger than the predefined threshold voltage at least for the predefined time. For resetting the determination of the class and the type of the power providing device performed by the electrical device the power providing device may provide no voltage to the electrical device or a voltage being smaller than or equal to the predefined threshold voltage.

The relation between a) voltage pulses and b) classes and types of a power providing device can be defined in the power providing device classification rules and the relation between a) the sequence of classification current pulses and b) classes and types of an electrical device can be defined in the electrical device classification rules.

In another aspect of the present invention a power providing device to be used in a power providing system is presented, wherein the power providing device is adapted to be operated in a classification mode, in which a class of the power providing device indicating the amount of power provided by the power providing device in an operational mode and a class of an electrical device of the power providing system indicating an amount of power at which the electrical device will be operated in an operational mode are determined, wherein the power providing device is adapted such that in the classification mode:
  in a first phase, the power providing device provides one or several voltage pulses within a predefined voltage range to the electrical device, measures one or several classification current pulses drawn by the electrical device and determines the class of the electrical device based on the measured drawn current pulses,
  in a second phase, the power providing device provides one or several voltage pulses within the predefined voltage range for indicating the class of the power providing device to the electrical device.

In a further aspect of the present invention an electrical device to be used in a power providing system as defined in claim 2 is presented, wherein the electrical device is adapted to be operated in a classification mode, in which a class of a power providing device of the power providing system indicating an amount of power provided by the power providing device in an operational mode and a class of the electrical device indicating an amount of power at which the electrical device will be operated in an operational mode are determined, wherein the electrical device is adapted such that in the classification mode:
  in the a first phase, the electrical device draws one or several classification current pulses for indicating the class of the electrical device, while the power providing device provides one or several voltage pulses within a predefined voltage range to the electrical device,
  in a second phase, the electrical device measures one or several voltage pulses provided by the power providing device and determines the class of the power providing device depending on the measured voltage pulses.

In another aspect of the present invention a control method for controlling a power providing system as defined in claim 2 is presented, wherein the control method is adapted such that in a classification mode:
  in a first phase, the power providing device provides one or several voltage pulses within a predefined voltage range to the electrical device and the electrical device draws one or several classification current pulses for indicating the class of the electrical device, wherein the power providing device measures the drawn one or several classification current pulses and determines the class of the electrical device based on the measured drawn classification current pulses, in a second phase, the power providing device provides one or several voltage pulses within the predefined voltage range for indicating the class of the power providing device to the electrical device, wherein the electrical device measures the one or several voltage pulses and determines the class of the power providing device depending on the measured voltage pulses.

In a further aspect of the present invention a computer program for controlling a power providing system as defined in claim 1 is presented, wherein the computer program comprises program code means for causing the power providing system to carry out the control method as defined in claim 12, when the computer program is run on the power providing system.

The computer program may comprise several subprograms, wherein, for instance, a first subprogram may be implemented on the power providing device and a subprogram may be implemented on the electrical device, in order to control these devices in accordance with the control method.

It shall be understood that the power providing device of claim 1, the power providing system of claim 2, the electrical device of claim 11, the control method of claim 12 and the computer program of claim 13 have similar and/or identical preferred embodiments, in particular, as defined in the dependent claims.

It shall be understood that a preferred embodiment of the present invention can also be any combination of the dependent claims or above embodiments with the respective independent claim.

These and other aspects of the invention will be apparent from and elucidated with reference to the embodiments described hereinafter.

DETAILED DESCRIPTION OF EMBODIMENTS

Figure 1:
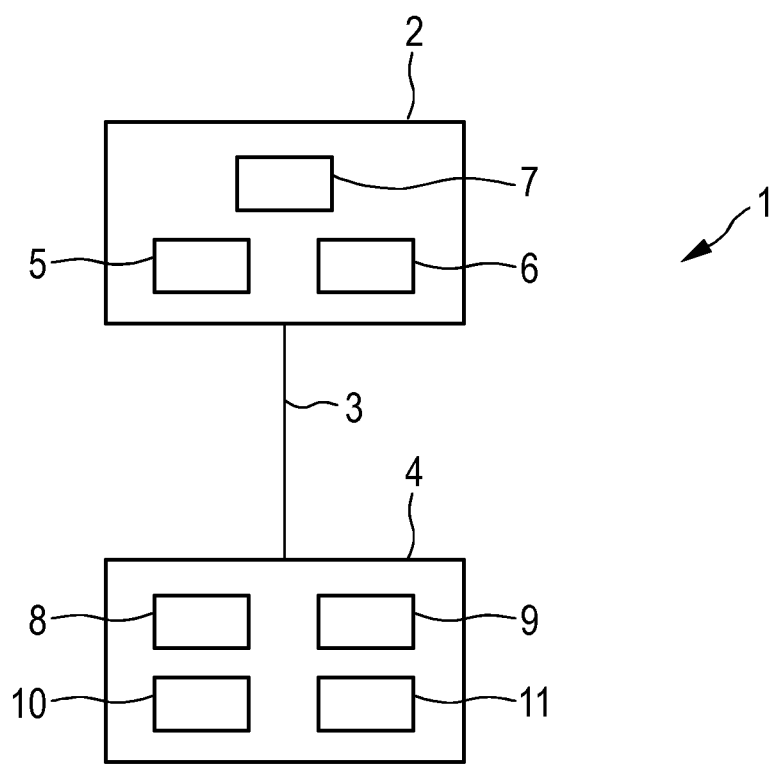
FIG. 1 shows schematically and exemplarily an embodiment of a power providing system comprising a power providing device and an electrical device.

FIG. 1 shows schematically and exemplarily an embodiment of a power providing system 1 comprising a power providing device 2 and an electrical device 4. In this embodiment the power providing device 2 is a PSE in accordance with a PoE standard and the electrical device is a PD in accordance with the PoE standard. The power providing device 2 and the electrical device 4 are connected via an Ethernet cable 3.

The power providing device 2 and the electrical device 4 are adapted to be operated in a classification mode, in which the class of the power providing device 2 indicating the amount of power provided by the power providing device 2 in its operational mode and the class of the electrical device 4 indicating the amount of power at which the electrical device 4 will operated in its operational mode are determined. The power providing device 2 and the electrical device 4 are adapted such that in the classification mode, in a first phase, the power providing device 2 provides one or several voltage pulses within a predefined voltage range to the electrical device 4 and the electrical device 4 draws one or several classification current pulses for indicating the class of the electrical device 4, wherein the power providing device 2 measures the drawn one or several classification current pulses and determines the class of the electrical device 4 based on the measured drawn currents. The power providing device 2 and the electrical device 4 are further adapted such that in the classification mode in a second phase the power providing device 2 provides one or several voltage pulses within the predefined voltage range for indicating the class of the power providing device 2 to the electrical device 4, wherein the electrical device 4 measures the one or several voltage pulses and determines the class of the power providing device 2 depending on the measured voltage pulses, i.e. preferentially based on the number of the measured voltage pulses. The predefined classification voltage range is preferentially 15.5 V to 20.5 V.

Preferentially, the electrical device 4 is adapted to, in the first phase, measure the voltage pulses provided by the power providing device 2 and determine the class of the power providing device 2 depending on the measured voltage pulses, wherein the power providing device 2 is adapted to, after the first phase and before the second phase, provide no voltage being larger than a predefined threshold voltage at least for a predefined time, wherein the electrical device 4 is adapted to reset the determination of the class of the power providing device 2 performed in the first phase, if the electrical device 4 has not measured a voltage being larger than the predefined threshold voltage at least for the predefined time. Thus, in the first and second phases the electrical device 4 can act in the same way, i.e. it is not necessary to configure the electrical device 4 such that it behaves differently in the first and second phases. For resetting the determination of the class of the power providing device 2 performed in the first phase by the electrical device 4 the power providing device 2 may provide no voltage to the electrical device 4 for the predefined time or a voltage being smaller than or equal to the predefined threshold voltage for the predefined time.

The power providing device 2 is adapted to, in the first phase, provide voltage pulses within the predefined voltage range, until classification current pulses have been measured being sufficient for determining the class of the electrical device 4. Thereby, the power providing device 2 will likely indicate a wrong class to the electrical device 4, but this is not a problem, because this determination of the class of the power providing device will be reset and the class of the power providing device will be determined again in the second phase.

The power providing device 2 and the electrical device 4 comprise electrical device classification rules defining a class of an electrical device based on classification current pulses and power providing device classification rules defining a class of a power providing device based on measured voltage pulses. The electrical device 4 is adapted to generate the classification current pulses in accordance with the electrical device classification rules for indicating the class of the electrical device 4, wherein the power providing device 2 is adapted to, in the first phase, determine the class of the electrical device 4 based on the electrical device classification rules and the measured classification current pulses. The power providing device 2 is adapted to, in the second phase, provide voltage pulses within the predefined voltage range in accordance with the power providing device classification rules for indicating the class of the power providing device 2 to the electrical device 4 and the electrical device 4 is adapted to, in the second phase, determine the class of the power providing device 2 based on the measured voltage pulses and the power providing device classification rules.

The electrical device 4 and the power providing device 2 are each assigned to a type of a group of possible types, wherein a type of a power providing device 2 indicates amounts of power providable by the power providing device 2 in its operational mode and a type of an electrical device 4 indicates amounts of power at which the electrical device is operable in its operational mode. Preferentially, in the classification mode not only the classes of the power providing device 2 and the electrical device 4 are determined, but also their types. In particular, the power providing device 2 and the electrical device 4 are preferentially adapted such that in the classification mode in the first phase the electrical device 4 draws one or several classification current pulses for indicating the class and type of the electrical device 4, wherein the power providing device 2 determines the class and the type of the electrical device 4 based on the measured drawn classification current pulses. Moreover, the power providing device 2 and the electrical device 4 are preferentially adapted such that in the classification mode in the second phase the power providing device 2 provides one or several voltage pulses within the predefined voltage range for indicating the class and type of the power providing device 2 to the electrical device 4, wherein the electrical device 4 determines the class and the type of the power providing device 2 depending on the measured voltage pulses.

The type of a power providing device and the type of an electrical device can be regarded as being containers for certain capabilities and common specifications. The power providing device classification rules may also comprise rules for defining a type of a power providing device depending on one or several voltage pulses within the predefined voltage range provided by a power providing device. Moreover, the electrical device classification rules can also comprise rules defining a type of an electrical device depending on drawn classification current pulses. For instance, the power providing device classification rules can define that a type of a power providing device is indicated by the duration of one or several voltage pulses within the predefined voltage range and a class of the power providing device is indicated by the number of voltage pulses within the predefined voltage range. The electrical device classification rules can define that the type and the class of an electrical device are defined by a certain sequence of classification current pulses. For instance, the electrical device can be adapted to draw at least one of a group of five different amounts of classification current pulses numbered 0 through 4, wherein a sequence of these classification current pulses can indicate the respective type and class of the respective electrical device. For instance, a first sequence 4,4,0,4 may indicate "type 3" with a class indicating that the electrical device will be operated at 30 W in its operational mode, and a second sequence 4,4,1,4 may indicate "type 3" with a class indicating that the electrical device will be operated at 45 W in its operational mode.

The power providing device 2 can be able to provide different amounts of power, in order to be operated in different classes, wherein the power providing device 2 can be adapted such that in the classification mode in the second phase the power providing device 2 provides the one or several voltage pulses such that it indicates a class corresponding to the largest amount of power providable by the power providing device 2, if the determined class of the electrical device 4 indicates an amount of power being larger than the amount of power maximally providable by the power providing device 2. Correspondingly, the electrical device 4 can be adapted to, if the determined class of the power providing device indicates an amount of power being smaller than the amount of power indicated by the class of the electrical device 4, be operated in its operational mode at the smaller amount of power provided by the power providing device 2. Thus, the power providing device 2 may grant as much power as it is capable for allocating, even if that is less than what the electrical device 4 requests.

For providing the voltage pulses in the classification mode and for providing the power in the operational mode the power providing device 2 comprises a power source 5. The power source 5 may comprise an AC/DC converter for converting AC mains power received from a mains power source to DC power to be provided to the electrical device 4. However, the power source 5 can also be another kind of power source for providing power to the electrical device 4. The power providing device 2 further comprises a current measurement unit 6 for measuring the current drawn by the electrical device 4 and a controller 7 for controlling the power providing device 2, especially the power source 5 and the current measurement unit 6, and for performing determination procedures like determining the type and class of the electrical device 4 depending on the measured currents.

The electrical device 4 comprises a voltage measurement unit 8 for measuring the voltage applied to the electrical device 4 by the power providing device 2 and a current drawing unit 9 for drawing certain currents for indicating the type and class of the electrical device 4 to the power providing device 2. In particular, the current drawing unit 9 comprises several resistances, in order to draw certain specific classification current pulses. The electrical device 4 further comprises an electrical consumer like a lighting unit consuming the power provided by the power providing device 2, when the power providing device 2 and the electrical device 4 are in their operational modes, and a controller 10 for controlling the electrical device 4, especially the voltage measurement unit 8, the current drawing unit 9 and the electrical consumer 11. The controller 10 is further adapted to perform determinations like the determination of the type and the class of the power providing device 2 based on the measured voltage pulses.

Figure 2:
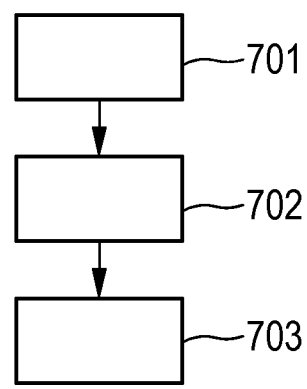
FIG. 2 shows a flowchart exemplarily illustrating an embodiment of a control method for controlling the power providing system shown in FIG. 1, FIGS. 3 and 4 illustrate schematically and exemplarily classification events and classification currents for different combinations of power providing devices and electrical devices.

In the following an embodiment of a control method for controlling the power providing system 1 will exemplarily be described with reference to a flowchart shown in FIG. 2.

After the electrical device 4 has been connected to the power providing device 2 by using the Ethernet cable 3, in step 701 in a first phase of a classification mode the power providing device 2 provides one or several voltage pulses within the predefined voltage range to the electrical device 4 and the electrical device 4 draws one or several classification current pulses for indicating the class of the electrical device 4. Moreover, in step 701 the power providing device 2 measures the drawn one or several classification current pulses and determines the class of the electrical device 4 based on the measured drawn classification current pulses, and the electrical device 4 measures the voltage pulses provided by the power providing device 2 and determines the class of the power providing device 2 depending on the measured voltage pulses.

In step 702 the power providing device 2 provides a voltage being smaller than the predefined threshold voltage or no voltage to the electrical device 4 for the predefined time, in order to indicate to the electrical device 4 that it should reset the determination of the class of the power providing device 2 performed in step 701. Moreover, the electrical device 4 measures that a voltage being smaller than the predefined threshold voltage or no voltage has been applied to the electrical device 4 for the predefined time and the electrical device 4 resets the determination of the class of the power providing device 4 performed in step 701.

In step 703 in the second phase the power providing device 2 provides one or several voltage pulses within the predefined voltage range for indicating the class of the power providing device 2 to the electrical device 4, wherein the electrical device 4 measures the one or several voltage pulses and determines the class of the power providing device 2 depending on the measured voltage pulses.

The above described classification procedure may be implemented in a successor of the PoE standard 802.3 at like 802.3bt or in another PoE standard. In particular, the above described classification procedure may be used for extending the two-event classification mechanism of the PoE standard 802.3 at.

In the PoE standard 802.3bt it could be defined that the power providing device classification rules may correspond to following Table 1:

| Event count | Power offer | Type |
|---|---|---|
| 1 event | 15 W | Types: 1, 2, 3, 4 |
| 2 event | 30 W | Types: 2, 3, 4 |
| 3 event | 30 W | Types: 3, 4 |
| 4 event | 45 W, 60 W | Types: 3, 4 |
| 5 event | 75 W, 90 W | Types: 4 |

The types mentioned in Table 1 exemplarily indicate the types of power providing devices which have the capability to offer the respective amount of power. The events mentioned in Table 1 relate to the number of voltage pulses, i.e. classification events, generated by the power providing device for indicating its class.

Types and classes of electrical devices and electrical device classification rules, which could be implemented in the PoE standard 802.3bt, will be exemplarily described in the following.

For instance, a type 1 PD may indicate its class by drawing the classification current 0, if it requests 15 W, the classification current 1, if it requests 4 W, the classification current 2, if it requests 7 W, and the classification current 3, if it requests 15 W, wherein it does preferentially not recognize anything beyond a single classification event. If presented with multiple classification events, the PD will repeat the same classification current for every event. A type 2 PD may indicate its class by drawing the classification current 4 at every classification event. If the PD sees only a single classification event, it will consider the PSE as being a type 1 PSE and will subsequently only be allowed to draw maximal type 1 power. If the PD sees a second classification event, it will recognize the PSE as a type 2 PSE and understands this as being allowed to draw maximum type 2 power. Classification events beyond the second have no meaning for a type 2 PD.

The electrical device classification rules of the PoE standard 802.3bt may also define a type 3 PD and a type 4 PD. For these PD types the generation of the classification current pulses may depend on the desired power. For instance, if the PD wants to have 15 W or less, it may show a type 1 PD behavior with regard to classification. The PD may then also check the type of the PSE based on the duration of the first voltage pulse, wherein a relative long duration within a predefined duration range would indicate that the PSE is a type 3 or a type 4 PSE and a smaller duration would indicate that the PSE is a type 1 or type 2 PSE. If the PD wants to have 30 W, it may show a type 2 PD behavior, wherein also in this case the PD may check the type of the PSE based on the duration of the first voltage pulse. And, if the PD wants to have more than 30 W, the PD may generate the classification current 4 for the first two classification events, in order to ensure backward compatibility with type 1 and type 2 PSEs, and for subsequent classification events the PD may switch to a different classification current, for instance, as described in following Table 2:

| Current responses to classification events | Type | Requested power level |
|---|---|---|
| 4, 4, 4 | Type 3 | 30 W |
| 4, 4, 0, 0 | Type 3 | 45 W |
| 4, 4, 1, 1 | Type 3 | 60 W |
| 4, 4, 2, 2, 2 | Type 4 | 75 W |
| 4, 4, 3, 3, 3 | Type 4 | 90 W |

If the power providing device classification rules and the electrical device classification rules were in this way in accordance with the PoE 802.3bt standard, mutual identification problems would exist. In particular, PSEs would not always be able to tell certain PDs apart. Following "blind spots" would exist.

A type 3 PSE and a type 4 PSE would not be able to distinguish a type 2 PD, which responses with classification current 4, a type 3 PD operating at a power of 30 W in its operational mode and showing a type 2 PD behavior with regard to classification and, if the PSE only has 15 W or 30 W available, i.e. if the PSE provides only one or two voltage pulses, a type 3 PD operating at a power of 45 W, 60 W, 75 W or 90 W, from each other. Moreover, a type 3 PSE or a type 4 PSE would not be able to distinguish a type 1 PD generating a classification current 0, 1, 2 or 3 from a type 3 PD generating a classification current 0, 1, 2 or 3.

These problems of mutual identification will in the following be described in more detail with reference to FIG. 3, in which the problematic combinations are highlighted by boxes 20 . . . 23.

The box 20 illustrates the problem of a type 3 PSE providing 15 W or less in its operational mode to distinguish between a type 1 PD operating at 15 W in its operational mode and a type 3 PD operating at 15 W in its operational mode. Since this PSE only has 15 W to offer, according to Table 1 it can only produce one classification event. Both PDs respond with classification current 3. It would therefore not be possible to make a distinction based on this single classification event that is also backwards compatible. The PSE could make another classification event, without risking that the PD would consume more than 15 W, because a PD that responses with a classification current 0, 1, 2 or 3 on the first event is restricted to 15 W or less.

The box 21 illustrates a combination of a type 3 PSE, which offers 15 W in its operational mode, with a type 2 PD or type 3 PD requiring 30 W in its operational mode or a type 3 PD requiring 45 W in its operational mode. Since this PSE only has 15 W to offer, it can only generate one classification event. The PDs will all draw a classification current 4. The PSE cannot make another classification event, because it is dealing with a PD that is aiming to get 30 W or more. If the PSE made a second classification event, in order to find out what kind of PD it is dealing with, it would be promising 30 W which it does not have.

The box 22 illustrates combinations of a) a type 3 PSE offering 30 W in its operational mode with a type 1 PD requiring 15 W in its operational mode or a type 3 PD requiring 15 W in its operational mode and b) a type 3 PSE offering 45 W in its operational mode with the type 1 PD requiring 15 W in its operational mode or with the type 3 PD requiring 15 W in its operational mode. The problems resulting from these combinations are similar to the problems described above with reference to the box 20, with the distinction that the PSE has more power to offer such that it could produce more classification events with impunity, because a PD that response with a classification current 0, 1, 2 or 3 on the first classification event is restricted to less than 15 W.

The box 23 illustrates a combination of a type 3 PSE offering 30 W with a type 2 PD requiring 30 W, a type 3 PD requiring 30 W or a type 3 PD requiring 45 W. Moreover, this box 23 illustrates a combination of a type 3 PSE offering 45 W with a type 2 PD requiring 30 W or a type 3 PD requiring 30 W. In these combinations the PSE cannot distinguish the PDs by design. Since a type 2 PD has a classification current code of 4, 4, . . . and, in accordance with Table 2, a type 3 PD has the same behavior, they cannot be told apart.

Figure 4:
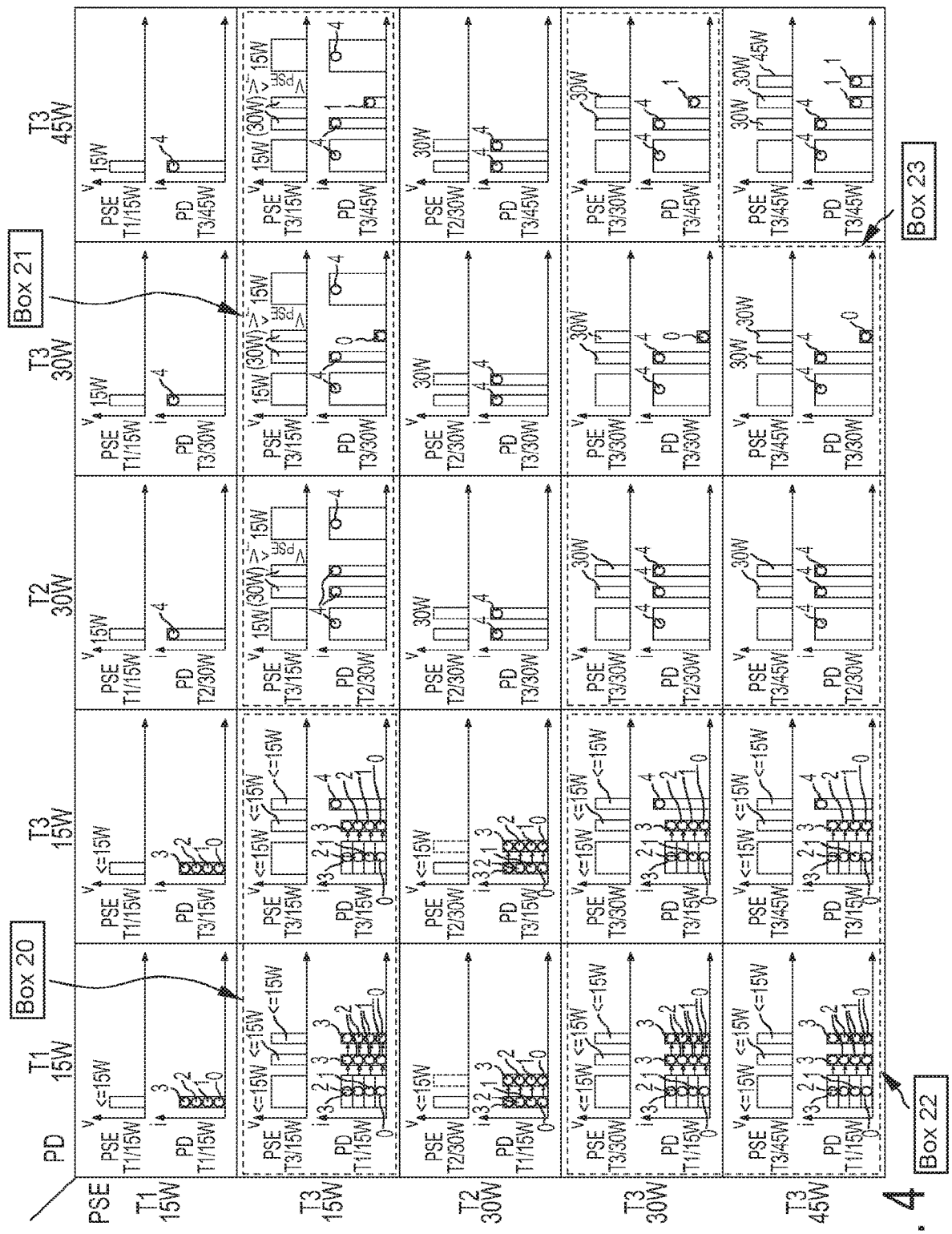

Solutions for these mutual identification problems, including the above described decoupling of the classification procedure into two phases, will in the following be described with reference to FIG. 4.

Figure 3:
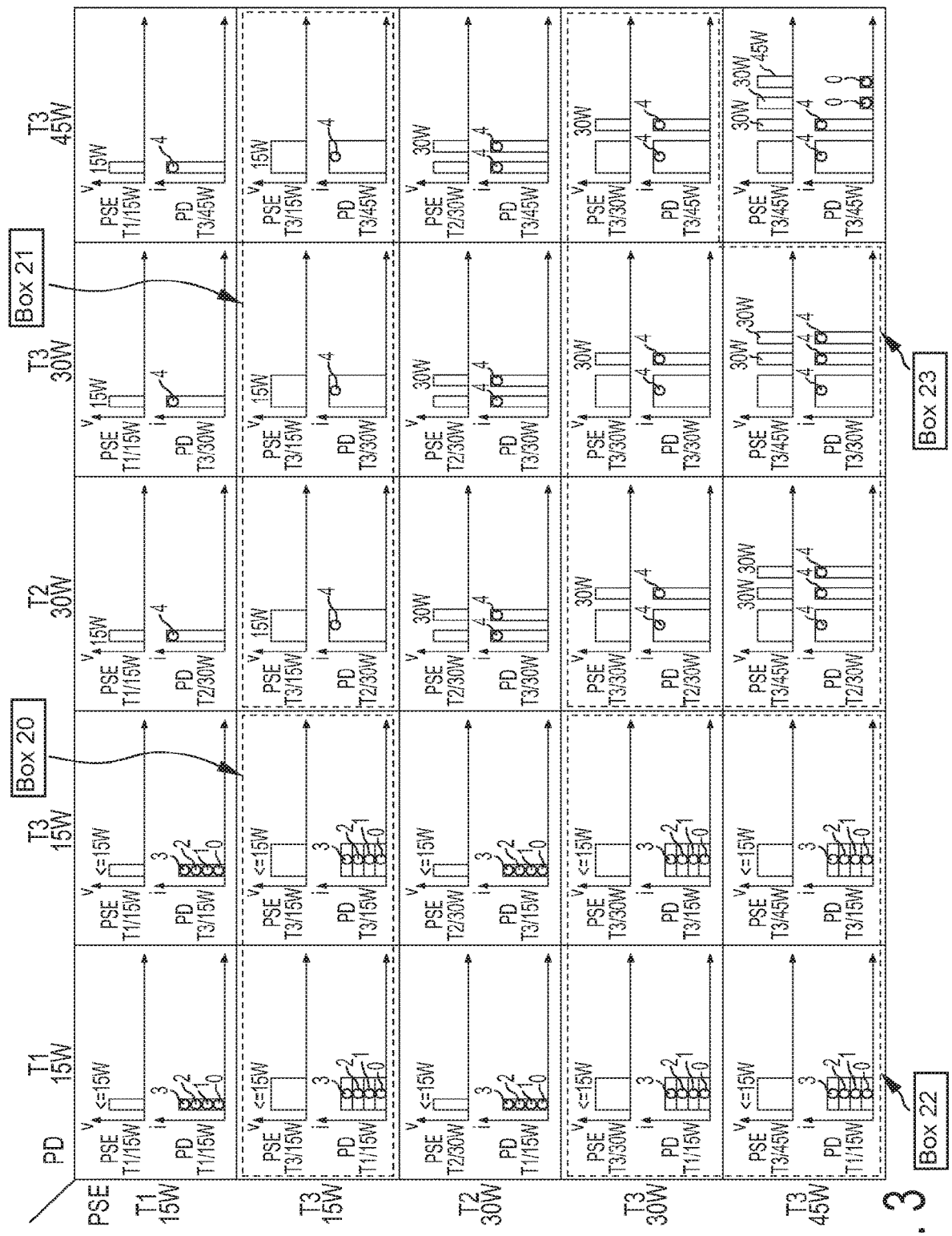

In the situations described above with reference to boxes 20 and 22 shown in FIG. 3 the type 3 PSE could generate more than a single classification event, without risking that the PD would consume more than 15 W. Thus, in situations, in which the response to the first classification event is a classification current 0, 1, 2 or 3, the type 3 PSE can generate as many classification events as required for determining the type and class of the respective PD. If a type 3 PD with a required power of maximally 15 W presents a classification current 4 from the third classification event onward, the type 3 PSE can distinguish this type 3 PD from a type 1 PD which will generate a classification current 0, 1, 2 or 3 for every classification event. This solves the mutual identification problems described above with reference to boxes 20 and 22 shown in FIG. 3. In order to solve the mutual identification problem described above with reference to box 23, the classification code for a type 3 PD requiring 30 W can be changed from 4, 4, 4 as defined in Table 2 to 4,4,0. Moreover, in an embodiment one of the classes indicating 45 W, 60 W, 75 W and 90 W may be removed and a unique class code may be introduced to distinguish a type 2 PD operating at 30 W from a type 3 PD or a type 4 PD operating at 30 W. This allows a type 3 PSE with a power budget being equal to or larger than 30 W to distinguish a type 2 PD from a type 3 PD with a 30 W power requirement.

For solving the problem described with reference to box 21 the above described decoupling of the classification procedure into two phases can be used. In particular, a part of this problem might be described by asking how a type 3 PSE with a power budget of 15 W can distinguish between a type 2 PD and a type 3 PD with power requirements of 30 W. These two PDs have different classification current codes, i.e. 4,4,4 for the type 2 PD and 4,4,0 for the type 3 PD having a power requirement of 30 W, if, as described above, in Table 2 the classification current code of the type 3 PD with a power requirement of 30 W is changed from 4,4,4 to 4,4,0. The type 3 PSE with a power budget of 15 W cannot find this out without producing three classification events. However, if it produces three classification events, it will have promised 30 W of available power, although only having 15 W available. It is therefore a problem, which is solved by the above described decoupling of the classification procedure into two phases, that a PSE would need to provide more classification events for identifying the PD than it would be allowed to produce, because the number of classification events indicates the power offered by the PSE and the PSE would not be allowed to offer more power than it can really provide.

In an embodiment the Ethernet cable connecting the PSE and the PD may be regarded as being a channel connecting a power interface (PI) of the PSE with a PI of the PD, wherein the PI is the electrical interface on the respective device side of a respective connector and wherein the connector contact may be part of the channel. In an embodiment a PSE, which might be a type 3 PSE offering 15 W, produces as many events as required to learn the nature of the connected PD. In this point it has promised power it does not have, but the PD is not powered yet. The PSE then proceeds to cause the voltage at the PSE PI to drop below the predefined threshold voltage which may be named $V_{reset}$ (for space reasons the threshold voltage is named $V_r$ in FIG. 4). It can be adapted to do this by turning off internal circuitry that generates the classification events, i.e. the voltage pulses for classifying the PSE, and which may also generate other voltages like mark and detection voltages. The PSE then waits for the predefined time, which may be named $T_{reset}$ and which guarantees that the previous determination of the class of the power providing device is reset, i.e., for instance that a PD's classification state machine has been reset. The PD now has "forgotten" the false promise of power. The PSE then proceeds with the second phase, optionally after having performed a detection phase, but this time it only produces an amount of classification events corresponding to the amount of power it can actually supply. This will in the following be described in more detail with reference to FIGS. 5 and 6.

Figure 5:
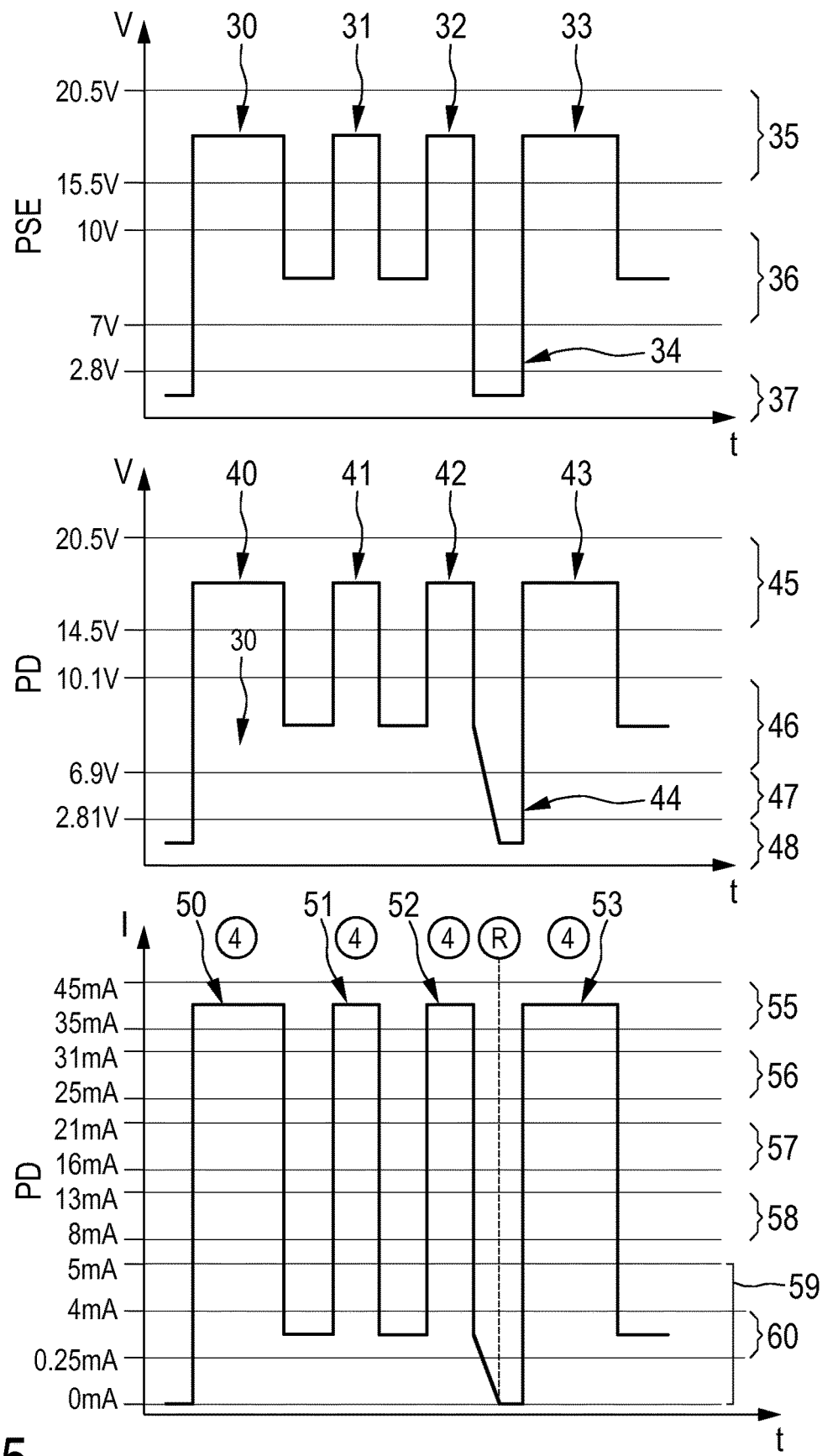
FIG. 5 illustrates schematically and exemplarily voltage pulses generated by a power providing device, voltage pulses measured by an electrical device and current pulses generated by the electrical device for a certain combination of a power providing device and an electrical device.

FIG. 5 exemplarily illustrates the generation of three classification events 30, 31, 32 within a predefined voltage range 35 in the first phase of the classification procedure by a type 3 PSE offering 15 W, wherein a connected type 2 PD responses with classification currents 50, 51, 52 being classification currents 4. After this first phase the PSE provides a voltage within a classification reset voltage range 37, wherein this voltage is smaller than the predefined threshold voltage, for the predefined time. This is indicated in FIG. 5 by reference number 34. The PD measures this small voltage within a classification reset voltage range 48 and resets all previous determinations of the class of the PSE. Then, in the second phase the PSE provides a further classification event 33 for indicating its class to the PD, whereupon the PD determines that the PSE offers 15 W because of the single classification event 33 in the second phase.

In FIG. 5 reference number 36 indicates a mark event voltage range at the PSE, reference number 45 indicates a classification event voltage range at the PD, reference number 46 indicates a mark event voltage range at the PD, reference number 47 indicates a classification reset threshold at the PD and reference number 48 indicates a classification reset voltage range. Moreover, reference numbers 55 to 59 indicate classification current ranges 4, 3, 2, 1, 0, respectively, and reference number 60 indicates a mark current range. The mark current range is used for distinguishing different current pulses from each other, i.e. in between the current pulses the current is lowered to a mark current $I_{mark}$ within the mark current range 60.

Figure 6:
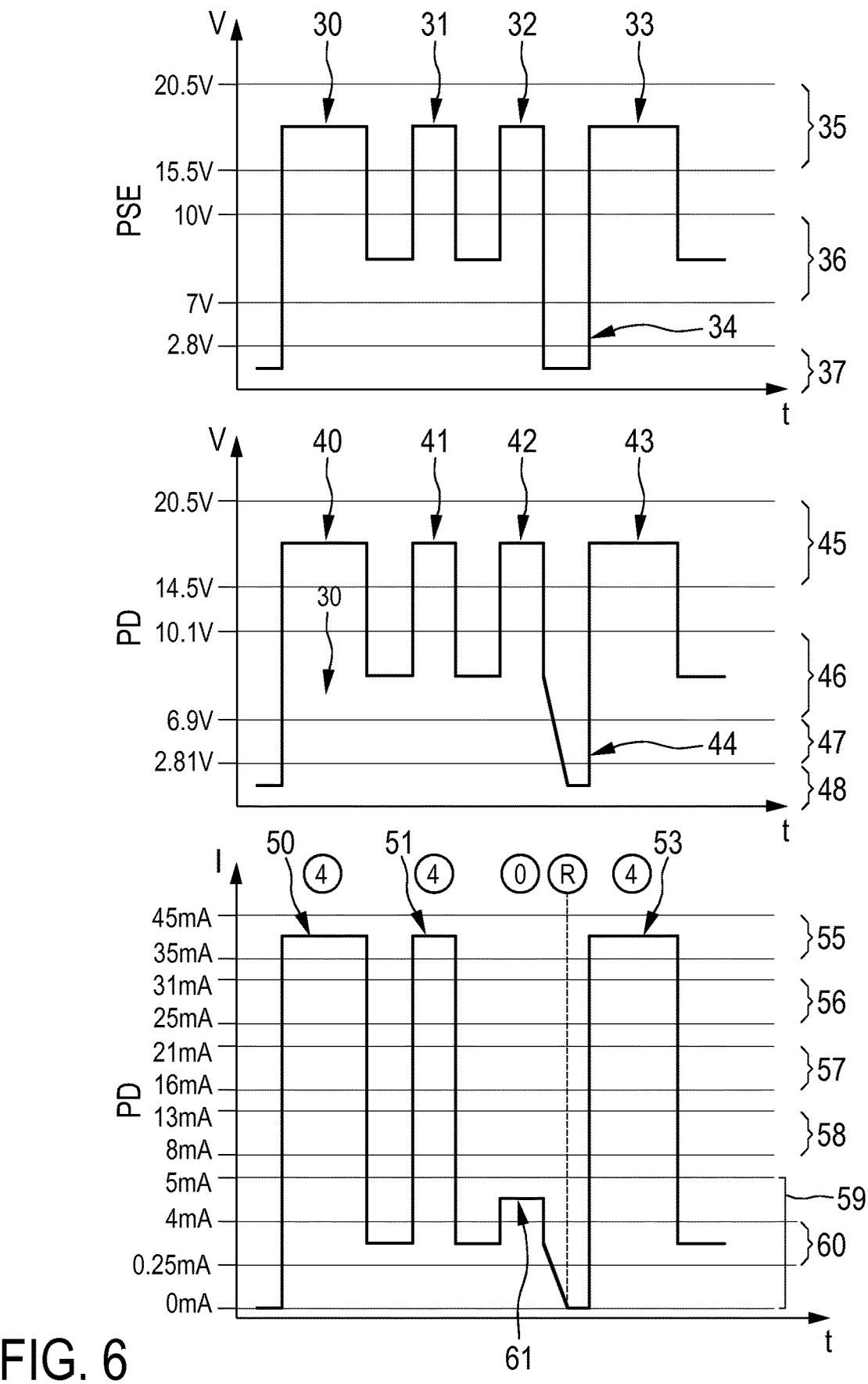
FIG. 6 illustrates schematically and exemplarily voltage pulses generated by a power providing device, voltage pulses measured by an electrical device and current pulses generated by the electrical device for a further certain combination of a power providing device and an electrical device.

FIG. 6 shows schematically and exemplarily a situation in which a type 3 PSE offering 15 W generates in the first phase three classification events 30, 31, 32 before lowering the voltage to a value being smaller than the predefined threshold voltage such that the voltage is within the classification reset voltage range 37. The PD being in this example a type 3 PD requiring 30 W or more measures corresponding voltage pulses 40, 41, 42 within a classification event voltage range 45 and also measures the voltage drop 44 within a classification reset voltage range 48 below the predefined threshold voltage. In response to the voltage pulses 30, 31, 32 the PD draws classification currents 50, 51, 61 within classification current ranges 4 (reference number 55), 4 (reference number 55) and 0 (reference number 59), in order to provide a classification current sequence 4,4,0. In response to the measured voltage drop 44 the PD resets all previous determinations of PSE classes. In the second phase the PSE generates a second classification event 33, i.e. a single voltage pulse 33, which results in a measured voltage pulse 43 at the PD within the classification event voltage range 45, whereupon the PD determines that the PSE will offer 15 W.

In an embodiment the PSE does not produce more classification events, i.e. voltage pulses, if the power the PD is requesting does not warrant it. For example, a 90 W PSE may signal its 90 W capability by producing five classification events in accordance with Table 1. If, however, a 45 W PD is connected, under consideration of Table 2 the PSE knows this fact by the third classification event (4,4,0). The PSE will then produce a fourth classification event to indicate that it is granting the 45 W request, but will not produce a fifth classification event.

PDs and PSEs are preferably adapted such that a PD can at least recognize the type and class, i.e. the amount of offered power, of its own type of PSE and of lower type PSEs. It is preferred that all mechanisms are built in such a way to ensure backward compatibility. For example, a type 4 PSE may look like a type 2 PSE from the viewpoint of a type 2 PD. In particular, the PSE of type 3 or type 4 may provide a longer first classification event than a PSE of type 1 and a PSE of type 2. This longer event may be ignored by type 1 and type 2 PDs, but may be detected by a type 3 or 4 PD, thus identifying the PSE as a type 3 or a type 4 PSE.

The two phase classification procedure with the intermediate reset step may be adopted into the PoE standard 802.3bt, wherein PSEs may add the sequence of classification events as shown in FIGS. 5 and 6 to a PSE state diagram. Implementation wise, to reset a PD half way through the classification procedure, the PSE might, for instance, connect the return conductors of the PI to the positive rail, resulting in forcing a voltage lower than $V_{Reset}$ be applied over the PI for at least $T_{Reset}$. It is also possible that the PSE changes to a high impedance state, i.e. the state it is in when idle. By guarantee of the PoE standard 802.3 at, a type 2 PD will self-discharge the PD PI with at least $I_{mark}$ until the PD has been reset. For a type 1 PD another method may be used, i.e., for instance, in order to distinguish a) a type 1 PD requesting 4 W, 7 W or 15 W by drawing one of the classification currents 0 to 3 in response to voltage pulses provided by the PSE from b) a type 3 PD requesting 4 W, 7 W or 15 W by drawing one of the classification currents 0 to 3 in response to voltage pulses provided by the PSE, the type 3 PD may be configured to respond to, for example, the third voltage pulse and/or a later voltage pulse provided by the PSE with a classification current 4 or a higher numbered classification current. The type 1 PD will just repeat the respective classification current 0, 1, 2 or 3.

In an embodiment the PSEs are adapted such that the reset method is not applied to a type 1 PD, but only to PDs having another type. The PSE preferentially performs the functions of detecting PDs through the channel, i.e. through one or several Ethernet cables, determining their requested amount of power and, if applicable, applying a voltage to the channel. The PSE is preferentially further adapted to monitor the voltage and the current and to maintain the voltage as long as there is no overload condition or as long as the respective PD is still connected. The respective PD may be adapted to present a valid detection signature in a detection mode, which allows the PSE to detect the PD through the channel, to present one or several valid classification current pulses while performing the classification procedure, in order to indicate the requested amount of power to the PSE, and to enable the load, i.e. the electrical consumer of the PD, once the PSE has granted the power in its operational mode.

Figure 7:
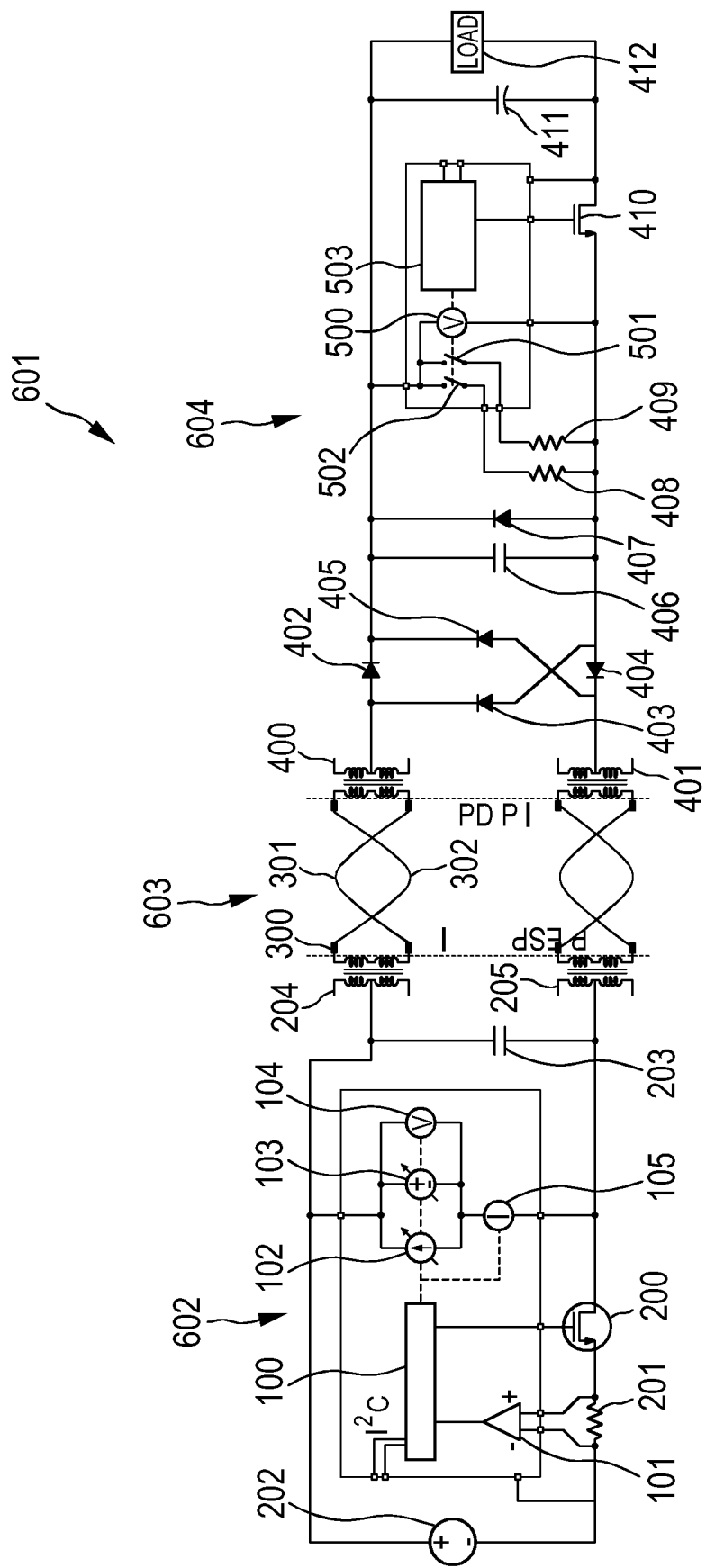
FIG. 7 shows schematically and exemplarily an embodiment of a power providing system comprising a power providing device and an electrical device.

FIG. 7 schematically and exemplarily shows an embodiment of an implementation of the power providing system comprising a PSE as power providing device and a PD as electrical device. The power providing system 601 comprises the PSE 602, the PD 604 and an intermediate channel 603. In a first detection procedure, which may also be regarded as being an identification procedure, the PSE 602 may force a voltage and/or a current on the PI within a detection voltage range, which might be a range from 2.8 V to 10 V. The PSE 602 is adapted to read a valid detection signature within a predefined resistance range, which might be from 19 kΩ to 26.5 kΩ, wherein in this embodiment the PSE 602 uses an internal voltage source 103 and an internal current source 102 for this purpose. Meters 104, 105 are used for checking the PI impedance. The PD 604 is adapted to present a valid detection resistance to the PSE 602, wherein the PD 604 may use for this an optionally switchable impedance 502, 408. During the classification procedure the PSE 602 produces one or several classification events, i.e. voltage pulses, in the classification voltage range, which might be from 15.5 V to 20.5 V, wherein also for producing the one or several classification events the internal voltage source 103 may be used. The current drawn by the PD 604 can be measured by using the internal current meter 105. The class will then be determined by a PSE controller 100 based on the measured drawn current. The PSE controller 100 is also adapted to control the different components of the PSE 602. The PD 604 is adapted to draw the classification currents during the classification events, wherein it preferentially uses a switchable resistance or switchable resistances 501, 409. The PD 604 may use different classification currents depending on the event count, especially if the 605 PD is a type 3 or type 4 PD. In particular, during the classification procedure in a first phase the PSE 602 produces as many classification events as required for determining the type and the class of the PD 604, whereupon the PSE 602 provides a zero voltage or a non-zero voltage being smaller than the predefined threshold voltage for the predefined time, in order to reset the determination of the class and the type of the PSE 602 by the PD 604, which had been determined during the first phase by measuring the voltage pulses with the voltage measurement unit 500 and by using a PD controller 503. After the previous determination of the class and the type of the PSE 602 has been reset, in the second phase the PSE 602 only applies the number of classification events to the PSE PI, which is required for indicating the type and the class of the PSE 602 to the PD 604.

If the PSE 602 decides to grant power to the PD 604, following successful identification and classification, it will apply the respective voltage by using the voltage 202 to the PSE PI by making a hot-swap 200 conducting. Initially, preferentially it controls the maximum current through the PSE PI using a current sense means 201, 101. The PD 604 is preferentially adapted to respond to the applied voltage exceeding a predefined further threshold voltage by opening its own hot-swap 410 and to provide the power to a load 412.

In this example the PSE 602 comprises a decoupling capacitor 203 and the intermediate channel 603 comprises Ethernet transformers 204, 205, 400, 401. The power is coupled in through the center tap, wherein the data goes in through the transformer ends that are unconnected in FIG. 7. Voltage is carried as common mode over the pairs, invisible to the data part. The intermediate channel 603 further comprises 8P8C connectors 300 and eight conductors 301, 302 in four twisted pairs, of which only two pairs are shown in FIG. 7. In order to provide a polarity insensitive PD 604, a full bridge rectifier 402, 403, 404, 405 using diodes and MOSFETs is used immediately after the Ethernet transformers 400, 401. The PD 604 further comprises an input capacitor 406 which might have a capacitance of maximally 100 nF, an optional Zener diode 407 for protecting the PD 604 from voltages being higher than expected and a bulk capacitor 411 which might have a capacitance of minimally 5 µF.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

Procedures like the determination of the class and the type of a power providing device and/or of an electrical device performed by one or several units or devices can be performed by any other number of units or devices. These procedures and/or the control of the power providing system in accordance with the control method can be implemented as program code means of a computer program and/or as dedicated hardware. In particular, the control of the power providing system in accordance with the control method can be implemented in the power providing device and in the electrical device, wherein the implementations in these devices cooperate for controlling the power providing system in accordance with the control method.

A computer program may be stored/distributed on a suitable medium, such as an optical storage medium or a solid-state medium, supplied together with or as part of other hardware, but may also be distributed in other forms, such as via the Internet or other wired or wireless telecommunication systems.

Any reference signs in the claims should not be construed as limiting the scope.

The invention relates to a power providing system comprising a power providing device like a PSE and an electrical device like a PD. In a classification mode in a first phase the power providing device provides one or several voltage pulses and the electrical device draws one or several classification current pulses for indicating the class of the electrical device, wherein in a second phase the power providing device provides one or several voltage pulses for indicating the class of the power providing device. Thus, the indication of the classes of the electrical device and of the power providing device is decoupled in two different phases, which can lead to an improved mutual classification procedure.

The invention claimed is:

1. A power providing device for a power providing system, wherein the power providing device is configured to operate in a classification mode, in which a class of the power providing device indicating an amount of power provided by the power providing device in an operational mode of the power providing device and a class of an electrical device of the power providing system indicating an amount of power at which the electrical device is operated in an operational mode of the electrical device are determined, wherein the power providing device is configured such that in the classification mode:

in a first phase, the power providing device provides first one or several voltage pulses within a predefined voltage range to the electrical device, measures one or several classification current pulses drawn on the first one or several voltage pulses by the electrical device and determines the class of the electrical device based on the measured one or several classification current pulses, in a second phase, the power providing device provides second one or several voltage pulses within the predefined voltage range for indicating the class of the power providing device to the electrical device, wherein the first one or several voltage pulses from which the class of the electrical device is determined in the first phase is different from the second one or several voltage pulses indicating the class of the power providing device to the electrical device in the second phase.

2. The power providing system of claim 1, comprising the power providing device and the electrical device, wherein in the second phase, the electrical device measures the second one or several voltage pulses and determines the class of the power providing device depending on the measured second one or several voltage pulses.

3. The power providing system as defined in claim 2, wherein the electrical device is configured to, in the first phase, measure the first one or several voltage pulses provided by the power providing device and determine a tentative class of the power providing device depending on the measured first one or several voltage pulses, wherein the power providing device is configured to, after the first phase and before the second phase, provide no voltage being larger than a predefined threshold voltage at least for a predefined time, wherein the electrical device is configured to reset a class determination of the power providing device, if the electrical device has not measured a voltage being larger than the predefined threshold voltage at least for the predefined time.

4. The power providing system as defined in claim 2, wherein the power providing device is configured to provide the first one or several voltage pulses within the predefined voltage range, until the one or several classification current pulses have been measured as being sufficient for determining the class of the electrical device.

5. The power providing system as defined in claim 2, wherein the power providing device is configured to, in the first phase, provide the first one or several voltage pulses within the predefined voltage range which indicates a class which does not correspond to a power which the power providing device provides in the operational mode of the power providing device.

6. The power providing system as defined in claim 2, wherein the power providing device is configured to provide different amounts of power, in order to be operated in different classes, wherein the power providing device is configured to, in the classification mode in the second phase, provide the second one or several voltage pulses such that the indicated class of the power providing device corresponds to the class of the electrical device, which has been determined in the first phase.

7. The power providing system as defined in claim 2, wherein the power providing device is configured to provide different amounts of power, in order to be operated in different classes, wherein the power providing device is configured to, in the classification mode in the second phase, provide the second one or several voltage pulses such that the indicated class of the power providing device corresponds to the largest amount of power providable by the power providing device, if the amount of power indicated by the class of the electrical device, which has been determined in the first phase, is larger than the largest amount of power providable by the power providing device.

8. The power providing system as defined in claim 2, wherein the electrical device is configured to, if the amount of power indicated by the determined class of the power providing device is smaller than the amount of power indicated by the class of the electrical device, operate in the operational mode of the electrical device at the amount of power indicated by the determined class of the power providing device.

9. The power providing system as defined in claim 2, wherein the electrical device and the power providing device are each assigned to a type of a group of possible types, wherein the type of the power providing device indicates amounts of power providable by the power providing device in the operational mode of the power providing device and a type of an electrical device indicates amounts of power at which the electrical device is operable in the operational mode of the electrical device, wherein the power providing device and the electrical device are configured such that in the classification mode:
  in the first phase, the electrical device draws the one or several classification current pulses for indicating the class of the electrical device and the type of the electrical device, wherein the power providing device determines the class of the electrical device and the type of the electrical device based on the measured one or several classification current pulses, and
  in the second phase, the power providing device provides the second one or several voltage pulses within the predefined voltage range for indicating the class of the power providing device and the type of the power providing device to the electrical device, wherein the electrical device determines the class of the power providing device and the type of the power providing device depending on the measured second one or several voltage pulses.

10. The power providing system as defined in claim 2, wherein the electrical device is assigned to a type of a group of possible types, wherein the type of the electrical device indicates amounts of power at which the electrical device is operable in the operational mode of the electrical device, wherein the group of possible types includes a first type indicating one or several first amounts of power and a second type indicating one or several second amounts of power, wherein at least one of the one or several first amounts of power is equal to at least one of the one or several second amounts of power and the power providing device and the electrical device are configured such that in the classification mode, in the first phase, the one or several classification current pulses indicate the class of the electrical device and the type of the electrical device, wherein the power providing device determines the class of the electrical device and the type of the electrical device based on the measured one or several classification current pulses, even if the electrical device is of the first type or of the second type and is operated in the operational mode in accordance with the one or several first amounts of power or the one or several second amounts of power.

11. An electrical device, wherein the electrical device is configured to operate in a two-phase classification mode, in which a class of a power providing device of a power providing system indicating an amount of power provided by the power providing device in an operational mode of the power providing device and a class of the electrical device indicating an amount of power at which the electrical device is operated in an operational mode of the electrical device are determined, wherein the electrical device is configured such that in the classification mode:
  in the a first phase, the electrical device draws one or several classification current pulses for indicating the class of the electrical device, while the power providing device provides first one or several voltage pulses within a predefined voltage range to the electrical device from which the one or several classification current pulses are drawn by the electrical device,
  in a second phase, the electrical device measures second one or several voltage pulses provided by the power providing device and determines the class of the power providing device depending on the measured second one or several voltage pulses,
  wherein the first one or several voltage pulses from which the class of the electrical device is indicated in the first phase is different from the second one or several voltage pulses from which the class of the power providing device is determined in the second phase.

12. A control method for controlling a power providing device comprising:
  in a first phase, providing first one or several voltage pulses within a predefined voltage range to an electrical device, wherein the electrical device draws, from the first one or several voltage pulses, one or several classification current pulses for indicating a class of the electrical device, and measuring the drawn one or several classification current pulses and determining the class of the electrical device based on the measured one or several classification current pulses, in a second phase, providing second one or several voltage pulses within the predefined voltage range for indicating a class of the power providing device to the electrical device, wherein the first one or several voltage pulses from which the class of the electrical device is determined in the first phase is different from the second one or several voltage pulses indicating the class of the power providing device to the electrical device in the second phase.

13. A non-transitory computer-readable medium comprising program code for causing a processor to perform the control method of claim 12 when the processor runs the program code.

\* \* \* \* \*